March 18, 1941. E. LEISTNER 2,235,073
AUTOMATIC TURRET LATHE
Filed Dec. 14, 1938 3 Sheets-Sheet 1
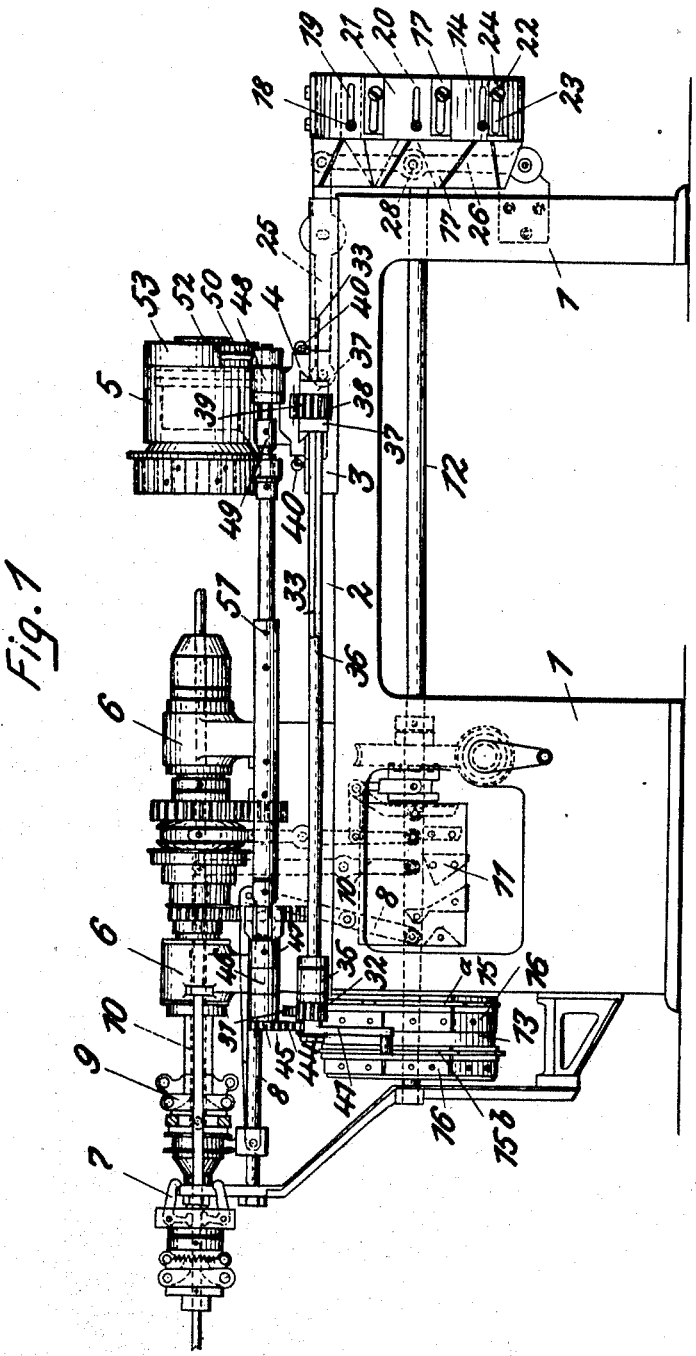
Inventor:

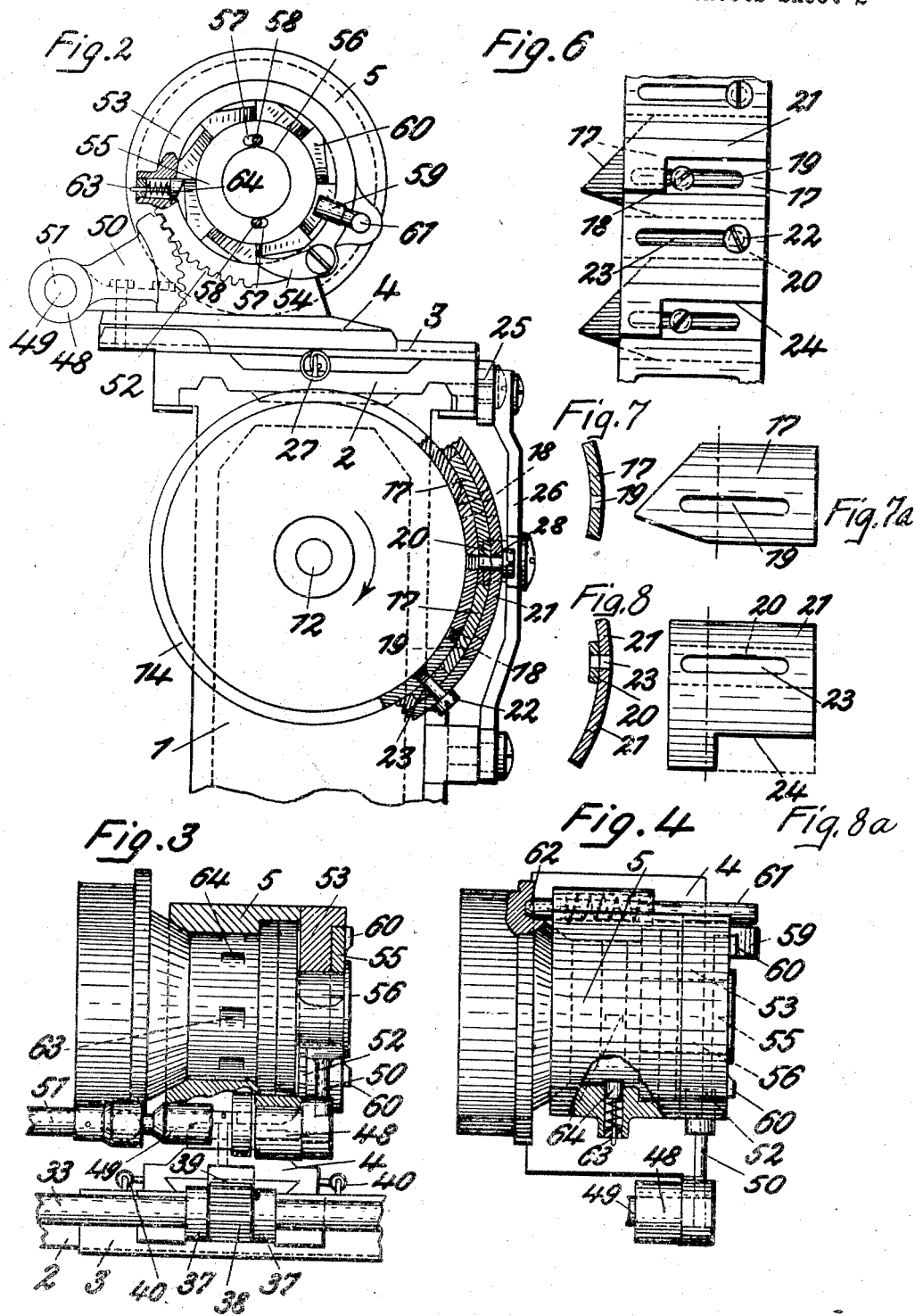

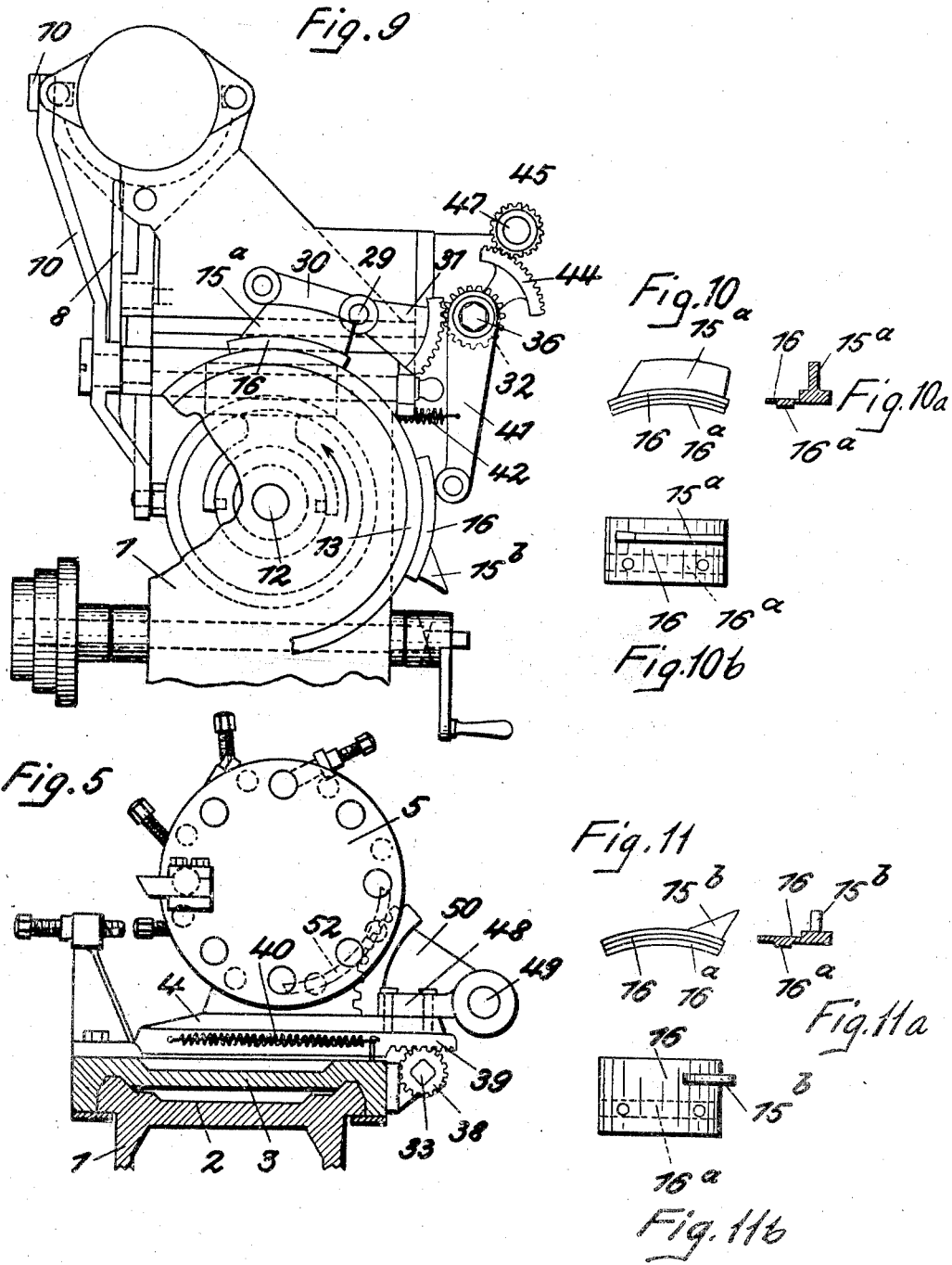

Patented Mar. 18, 1941

2,235,073

UNITED STATES PATENT OFFICE 2,235,073

AUTOMATIC TURRET LATHE

Erich Leistner, Heidenau in Saxony, Germany

Application December 14, 1938, Serial No. 245,658
In Germany December 18, 1937

6 Claims. (Cl. 29—43)

This invention relates to an automatic lathe in which adjusting means and bearings are provided so that, in addition to the usual automatic longitudinal travel of the revolving tool turret, an automatic cross travel is possible, the movements being carried out consecutively or at the same time and irrespectively of the position of the compound slide rest.

The controls are effected by cam drums which can be adjusted to the actual operation in a simple manner and at the same time utilized for automatically controlling both the revolving tool turret several times within a single operation and also the material feed. The advantage is obvious, as in this construction with stationary headstock practically all imaginable workpieces occurring in the turning and automatic machine shop can be produced on this turret lathe and lengths up to 100 millimetres and more can be dealt with, according to the type and size of the machine.

Thus, it is possible to machine parts of rod material and to carry out work in a single fixation, more particularly the turning down from large initial diameters in the case of external machining, and in the case of internal machining, to produce from a small initial bore a multiple stepped backed off internal diameter or bore, or to carry out machining of both kinds on one and the same workpiece. It follows that, with this manner of machining, all kinds of differently set up shaping can be carried out both on the outer side and on the inner side of the workpieces.

An embodiment of the invention is illustrated by way of example in the accompanying drawings, in which—

Fig. 1 shows a lathe in front elevation,

Fig. 2 shows the cam drum for the longitudinal travel of the slide rest and the revolving tool turret partly in side elevation and partly in section, Fig. 3 shows the revolving tool turret partly in front elevation and partly in section, Fig. 4 is a top plan view of Fig. 3, Fig. 5 is an end view of Fig. 3, Figs. 6, 7, 7a, 8 and 8a show the construction and arrangement of the cam drum illustrated in Fig. 2, Fig. 9 is a side elevation of the cam drum and the control arrangement for the slide rest cross travel, the cam races being each shown as a separate cam section, Figs. 10, 10a, 10b, 11, 11a and 11b show individual cam sections of the drum illustrated in Fig. 9 in side elevation, top plan view and section.

A bed 2 is supported by uprights 1 and carries a main saddle 3, on which a cross slide 4 with revolving tool box 5 is mounted.

6 designates a headstock with automatic workpiece guiding mechanism comprising chuck operating levers 7 and feed tube operating levers 9 controlled by a cam drum 11 through the intermediary of a rod system 8 and a rod system 10 respectively, this drum being mounted on a disengageable driving shaft 12. The shaft 12 also carries a drum 13 with two cam races for controlling the cross slide 4 and the revolving tool turret 5. A third drum 14 on the shaft 12 serves for the longitudinal displacement of the main saddle.

The cam races of the drum 13 are formed as separate cam sections 15a and 15b, which have flanges 16 conforming to the periphery of the drum and provided with fitting bars 16a which serve as fixation feet during the mounting of the cams on the drum.

Each cam section can therefore be removed and quickly replaced by another with the result that any kind of cam races can be built up as required.

The cams on the drum 14 are also composed of separate sections (Figs. 6 to 8).

Wall plates 17 are mounted on the drum and constructed as feed cams, the plates being longitudinally shiftable on the wall of the drum and secured at distances apart by means of bolts 18 extending through slots in the plates 17.

The gaps between the plates 17 are filled by guides 20, which are mounted on a second set of wall plates 21 overlapping the wall plates 17 and are also slidable and fixable on the drum by means of bolts 22 extending through slots 23.

To enable the bolts 18 to be exposed and the plates to be shifted, the slots 23 are arranged laterally and the plates 21 provided with cut out portions 24. The front end edges are straight.

Thus, the cam feed path can be composed as desired.

The number of control cam plates 17 and of the working cam plates 21 corresponds with the number of cams 15a and 15b.

A link 25 is hingedly connected at one end to the main saddle 3 and at its other end to one end of a lever 26 whose other end is hingedly connected to the tail upright 1.

A spring 27 (Fig. 2) for returning the main saddle 3, at the same time presses the roller 28 against the end surfaces of the plates 17 and 21 respectively, owing to the link 25 being coupled to the main saddle.

The cross travel of the revolving tool box takes place with the main saddle through the intermediary of the cam sections 15a against which the roller carrying arm 30 of a two-armed lever, pivotable about a pin 29, is resiliently pressed, whereas the toothed sector 31 forming the other arm of this lever meshes with a spur wheel 32 keyed on a shaft 30 mounted in an eye 35 and whose end 33 is of square cross section.

The shaft 30 is also mounted in a bifurcated eye 37 on the main saddle 3 and accommodates a spur wheel 36 loosely fitted on the square end 33 of the shaft 30. This spur wheel 36 meshes with a rack 39 on the cross slide 4 and thus effects the cross travel of the revolving tool turret 6.

The roller carrying arm 30 is pulled against the cams 15a by pull springs 40 secured at one end to the main saddle 3 and at their other end to the cross slide 4.

On the other end of the shaft 30 a two-armed lever is loosely mounted, whose roller carrying arm 41 is pulled against the cams 15b by a spring 42 and whose toothed sector-shaped arm 44 meshes with a spur wheel 46 keyed on a short shaft 47 journalled in a bearing 48.

A bearing 66 fixed on the cross slide 4 carries a short shaft 49 similar to the shaft 47 and on which a toothed sector 50 is keyed.

The short shafts 47 and 49 are hingedly connected for co-rotation by an intermediate element 51 variable in length.

The sector 50 meshes with a toothed sector 52 of an indexing ring 53 and by means of a spring loaded dog 54 mounted on the ring 53 effects the feed of a feed disc 55 when the shaft assembly 47, 49, 51 is oscillated by a cam section 15b.

This feed disc 55 is mounted on a hub 56 of the revolving tool turret and rotatably coupled therewith by pins 58 engaging in holes 57, a slight idle movement being obtained by making the holes of elongated shape.

This idle movement serves for releasing the notch-coupling for determining the positions of the revolving tool turret. Before the hub 56 is rotated the disc 55 first turns alone, and during this movement a roller 59 is pressed outwards by one of a plurality of cams 60 on the feed disc 55, and a spring loaded bolt 61 is pressed out of its locking position.

The idle movement of the disc 55 amounts to an angle of about 6°, after which a common feed takes place, for example through an angle of 45° depending upon the subdivision of the revolving tool turret.

During the return movement of the sector 50 and ring 53 the disc 55 is first turned through an angle of 6° by the dog 54 until the pins 58 abut against the ends of their holes 57, with the result that the bolt-notch coupling 61, 62 becomes operative, and the dog 54 engages the next following tooth when the disc 55 comes to a standstill.

A second locking device consists of a locking pin 63 secured against rotation and mounted under spring pressure in the housing of the revolving tool turret. This pin has a bevelled end which engages one of the teeth 64 of the feed disc 55.

I claim:

1. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal shaft, a roller carrying lever mounted on said shaft and resiliently pressed against the cam arrangement to impart an oscillating movement to said shaft, a spur wheel longitudinally shiftable on and rotatably connected with said shaft, and a rack projecting laterally from the cross-slide and meshing with said spur wheel to impart a transverse movement to said slide during the oscillation of said shaft.

2. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal articulated shaft, a roller carrying lever mounted on said shaft and resiliently pulled against the cam arrangement to oscillate said shaft, a notched mechanism on the cross-slide, and means on said shaft for actuating said mechanism to rotate the revolving tool box at the oscillation of said shaft.

3. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal shaft, a roller carrying lever keyed on said shaft and resiliently pulled against the cam arrangement to oscillate said shaft, a toothed sector keyed on said shaft, a hub on the revolving tool box, a toothed ring loosely mounted on said hub and meshing with said sector to rotate during the oscillation of said shaft with said sector, a feed disc on said ring, a pin and slot connection between said disc and said hub, and a dog carried by said ring and in operative engagement with said disc to impart at each oscillation of said shaft a rotary feed movement to said revolving tool box through the intermediary of said ring, pawl and feed disc.

4. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal shaft, a roller carrying lever keyed on said shaft and resiliently pulled against the cam arrangement to oscillate said shaft, a toothed sector keyed on said shaft, a hub on the revolving tool box, a toothed ring loosely mounted on said hub and meshing with said sector to rotate during the oscillation of said shaft with said sector, a feed disc on said ring, a pin and slot connection between said disc and said hub, and a dog carried by said ring and in operative engagement with said disc to impart at each oscillation of said shaft a rotary feed movement to said revolving tool box through the intermediary of said ring, pawl and feed disc, said pin and slot connection allowing an idle movement equal to an angle of several degrees in both directions between said toothed ring and said hub.

5. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal shaft, a roller carrying lever keyed on said shaft and resiliently pulled against the cam arrangement to oscillate said shaft, a toothed sector keyed on said shaft, a hub on the revolving tool box, a toothed ring loosely mounted on said hub and meshing with said sector to rotate during the oscillation of said shaft with said sector, a feed disc on said ring, a pin and slot connection between said disc and said hub, and a dog carried by said ring and in operative engagement with said disc to impart at each oscillation of said shaft a rotary feed movement to said revolving tool box through the intermediary of said ring, pawl and feed disc, said pin and slot connection allowing an idle movement equal to an angle of several degrees in both directions between said toothed ring and said hub, cams on said feed disc, a locking bolt on said revolving tool box, a roller carried by said bolt and located to engage in said feed disc at a distance in front of one of said cams equal to the idle movement between said toothed ring and said hub.

6. An automatic turret lathe, comprising in combination a main saddle, a cross slide on said saddle, a revolving tool turret on said cross slide, a cam arrangement composed of a drum with easily exchangeable cam sections and cooperating with all the aforesaid elements to automatically control their movements, a longitudinal shaft, a roller carrying lever keyed on said shaft and resiliently pulled against the cam arrangement to oscillate said shaft, a toothed sector keyed on said shaft, a hub on the revolving tool box, a toothed ring loosely mounted on said hub and meshing with said sector to rotate during the oscillation of said shaft with said sector, a feed disc on said ring, a pin and slot connection between said disc and said hub, and a dog carried by said ring and in operative engagement with said disc to impart at each oscillation of said shaft a rotary feed movement to said revolving tool box through the intermediary of said ring, pawl and feed disc, said pin and slot connection allowing an idle movement equal to an angle of several degrees in both directions between said toothed ring and said hub, cams on said feed disc, a locking bolt on said revolving tool box, a roller carried by said bolt and located to engage in said feed disc at a distance in front of one of said cams equal to the idle movement between said toothed ring and said hub, and a locking device mounted on said ring in engagement with said feed disc and adapted to periodically operate in synchronism with said bolt.

ERICH LEISTNER.